(12) United States Patent
Weik et al.

(10) Patent No.: US 7,123,994 B2
(45) Date of Patent: Oct. 17, 2006

(54) POWER CONSUMPTION MANAGEMENT METHOD

(75) Inventors: Hartmut Weik, Stuttgart (DE); Nina Köstering, Stuttgart (DE); Stephan Rupp, Besigheim (DE); Uwe Stahl, Leonberg (DE); Franz-Josef Banet, Vaihingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/045,075

(22) Filed: Jan. 31, 2005

(65) Prior Publication Data

US 2005/0192713 A1 Sep. 1, 2005

(30) Foreign Application Priority Data

Mar. 1, 2004 (EP) .................. 04290568

(51) Int. Cl.
*G06F 19/00* (2006.01)
*G01R 21/00* (2006.01)

(52) U.S. Cl. .............. 700/295; 700/286; 702/62; 705/80; 307/38; 307/39

(58) Field of Classification Search ............ 700/286, 700/291, 295, 22; 705/80, 412; 307/31, 307/32, 33, 38, 39; 702/60, 61, 62
See application file for complete search history.

(56) References Cited

U.S. PATENT DOCUMENTS

| | | | |
|---|---|---|---|
| 6,487,509 B1 | 11/2002 | Aisa | |
| 6,493,643 B1 | 12/2002 | Aisa | |
| 6,681,156 B1 * | 1/2004 | Weiss | 700/286 |
| 2003/0233201 A1 | 12/2003 | Horst et al. | |
| 2004/0167677 A1 * | 8/2004 | Weiss | 700/286 |

FOREIGN PATENT DOCUMENTS

| | | |
|---|---|---|
| DE | 100 62 027 A | 7/2002 |
| EP | 1 263 108 A | 12/2002 |
| EP | 1 372 238 A | 12/2003 |
| WO | WO 02/07365 A | 1/2002 |

OTHER PUBLICATIONS

U.S. Appl. No. 11/045,206 filed Jan. 31, 2005, entitled "Energy Management Method".
Palensky P. et al: "Demand side management in private homes by using LonWorks," Oct. 1, 1997, Factory Communication Systems, 1997, Proceedings. 1997 IEEE International Workshop on Barcelona, Spain, Oct. 1-3, 1997, New York, NY, USA, IEEE, US, pp. 341-347, XP010255516.
Brooke, Stauffer H.: "Smart Enabling System for Home Automation," May 1, 1991, IEEE Transactions on Consumer Electronics, IEEE INC New York, US, pp. 29-35, XP000234464.

* cited by examiner

*Primary Examiner*—Leo Picard
*Assistant Examiner*—Charles Kasenge
(74) *Attorney, Agent, or Firm*—Sughrue Mion, PLLC

(57) ABSTRACT

The invention concerns a method of managing energy consumed by a group of energy consuming devices (31 to 39) and energy consuming devices (31 to 36) for executing this method. Energy consuming devices (31 to 36) of the group of energy consuming devices exchange messages according to an energy management control protocol via a communication media (4). The energy management control protocol comprises an energy booking message type for announcing future energy consumption, an energy reduction indication message type for announcing possible reduction of energy consumption and a granting message type for granting an energy booking message and/or an energy reduction indication. The energy consuming devices (31 to 36) negotiate their energy consumption by means of the messages exchanged according to the energy management control protocol and control their energy consumption according to the result of this negotiation.

18 Claims, 2 Drawing Sheets

| 0 | HEAD | |
|---|---|---|
| 1 | SOURCE | Alcatel |
| 1 | VERSION | Rel.1.1 |
| 1 | ADDRESS | 1156 |
| 2 | TRANSACTION_ID | 0815 |
| 2 | TYPE BOOK | |
| 2 | START | |
| 3 | DATE | 010105 |
| 3 | TIME | 00:00:00:00 |
| 3 | UNITS | 1500 |
| 4 | DIMENSION W | |
| 2 | GRADIENT | |
| 3 | START | |
| 3 | DATE | 010105 |
| 3 | TIME | 00:01:00:00 |
| 3 | END | |
| 3 | DATE | 010105 |
| 3 | TIME | 00:06:00:00 |
| 3 | UNITS | 500 |
| 4 | DIMENSION W | |
| 3 | END | |
| 2 | END | |
| 3 | DATE | 010105 |
| 3 | TIME | 00:10:00:00 |
| 3 | UNITS | 0 |
| 0 | TRAILER | |

FIG. 2

POWER CONSUMPTION MANAGEMENT METHOD

TECHNICAL FIELD

The invention relates to a method of managing energy consumed by a group of energy consuming devices and an energy consuming device for executing this method.

The invention is based on a priority application, EP 04290568.7, which is hereby incorporated by reference.

BACKGROUND OF THE INVENTION

In a traditional model for electric power utilities, an electric power utility serves energy users or customers with its own facilities which includes a generator, a transmission network and a distribution network. A transformer station is connected between the transmission network and the distribution network. Consequently, the customer cannot choose between alternative sources of energy and must buy energy from the power utility that operates in its geographic region.

Further, power grids may be organized into control areas which are electrical systems bounded by interconnection metering and telemetry. The load between adjacent control areas is in such case balanced according to a predetermined schedule. If excess demand for electricity is generated in one control area it will receive electricity from adjacent control areas and the control area that is providing the excess electricity then bills the other control area for expenses caused by the deviation.

To avoid such additional expenses caused by deviation, it is known that the operators of the control area perform sophisticated efforts to predict the energy that will be consumed by the customers in the next week, on the next day, and in the next hour.

SUMMARY OF THE INVENTION

It is the object of the present invention to improve the predictability of the energy consumed by a customer and therefore help to improve the provision of energy in an energy distribution network having a plurality of energy consuming devices and a plurality of energy resources.

The object of the present invention is achieved by a method of managing energy consumed by a group of energy consuming devices, wherein the method comprising the steps of: exchanging messages according to an energy management control protocol via a communication media between energy consuming devices of the group of energy consuming devices and/or between energy consuming devices of the group of energy consuming devices and an energy management control device and/or an energy management measuring device, the energy management control protocol comprising an energy reduction indication message type for announcing possible reductions of energy consumption; negotiating the energy consumption of an energy consuming device of the group of energy consuming devices by means of the messages exchanged according to the energy management control protocol; and controlling the energy consumption of the energy consuming device according to the result of this negotiation. The object of the present invention is further achieved by an energy consuming device of a group of energy consuming devices, the energy consuming device having a communication unit for communicating with other energy consuming devices of the group of energy consuming devices and/or with an energy management control device and/or with an energy management measuring device, a protocol handling unit for handling an energy management control protocol, the energy management control protocol comprises an energy reduction indication message type for announcing possible reductions of energy consumption, and a control unit for negotiating the energy consumption of the energy consuming device by means of the protocol handling unit and controlling the energy consumption of the energy consuming device according to the result of this negotiation.

According to the principles of this invention, energy consuming devices are equipped with a protocol handling unit for handling a specific energy management control protocol with specific control elements adapted to negotiate the power consumption of the energy consuming device in an efficient way. This protocol makes it possible to shape the energy consumption of the group of energy consuming devices in an excellent way. The invention provides the basis of load balancing between the different energy consuming devices of the group and thereby ensures that the consumer reaches its energy consumption budget. Thereby, the invention ensures both, an economical efficient energy consumption of an energy consuming customer as well as a flexible provision of energy according to the consumer's needs.

Further advantages are achieved by the embodiments of the invention indicated by the dependent claims.

Preferably, the energy management control protocol additionally comprises an energy booking message type for announcing future energy consumptions. Such kind of message type may be used by an energy consuming device, if it detects events requesting changes in its future energy consuming behavior. Such additional message type improves the dynamic of the negotiation process.

Further, the energy management control protocol additionally comprises a granting message type for granting an energy booking message and/or an energy reduction indication message. The introduction of such additional message type has specific advantages in the case of a centrally controlled energy management system.

According to a preferred embodiment of the invention, the energy consuming devices of the group of energy consuming devices constitute a self-organizing network of power consuming devices interacting via the energy consuming control protocol. There is no central energy management control device providing scheduling functionalities within this network. Each of the energy consuming devices has a set of scheduling rules and negotiates its power consumption with the other energy consuming devices of the group of energy consuming devices according to these rules. This approach improves the flexibility of the system. Each device is aware of its power consumption and is equipped with a control unit capable to negotiate its power consumption by means of the scheduling rules and the energy management control protocol on the fly.

But, it is also possible that a central energy management control device plays the role of a scheduling unit centrally scheduling the energy consumption of the energy consuming devices of the group of energy consuming devices. The energy management control device stores information about available energy assigned to the group of energy consuming devices and has a protocol handling unit for negotiating with the energy consuming devices of the group of energy consuming devices via the energy management control protocol. It schedules energy consumption with respect to the available energy assigned to the group and with respect to booking messages and indication messages received from energy consuming devices of the group. Further, it uses granting messages to control the energy consumption behavior of the energy consuming devices according to the scheduling results. Such approach makes it possible for the consumer to centrally set the available energy assigned to the group which improves the user friendless of the system.

Further, it is possible that the system is equipped with an energy management measuring device informing the energy consuming devices of the group about the total amount of energy consumed and/or about the available energy at present assigned to the group. The self-organizing network of power consuming devices negotiate by means of these data via the energy consumption control protocol the energy consumption scheduled to each of the energy consuming devices. This makes it possible to enlarge the group of energy consuming devices with some simple and cheap energy consuming devices that are not equipped with a protocol handling unit. The energy consumption of these devices can be respected by the interacting energy consuming devices by means of the information received from this energy management measuring device. This approach improves the cost efficiency of the system.

Further, it is also possible to equip an energy management control device with such energy measurement capability to gain these advantages also in case of a centrally controlled energy management system.

According to a preferred embodiment of the invention, the energy management control protocol additionally comprises a request message type for requesting the reduction or the increase of energy consumption. When receiving such request message, an energy consuming device replies with an indication message or a booking message dependent on the request specified in the request message and the current energy consuming situation of the energy consuming device. If the energy consuming device, for example, receives a request message requesting to indicate possible reductions of energy, the energy consuming device responds with an indication message indicating possible reductions of energy consumption. If the energy consuming device receives, for example, a request message requesting an increase of energy consumption, the energy consuming device checks its possibilities to increase its power consumption and responds with a respective booking message, if such increase of power consumption is possible.

Further, it is also possible that the energy consuming device automatically increases or reduces its energy consumption, if it receives a specific request message. Preferably, such kind of request messages are used in a centrally controlled energy management system.

Preferably, the request messages of the request message type include information about the requested reduction or increase of energy consumption, in particular they specify a detailed profile of the requested reduction or increase of energy consumption.

According to a further preferred embodiment of the invention, an energy consuming device of the group of energy consuming devices issues a booking message for announcing desired changes in its future energy consumption behavior, when it detects a corresponding event. For example, the energy consuming device is switched on/off by the consumer or the consumer inputs changes in the operation parameters of the energy consuming device. The energy consuming device detects such changes of operation parameters and issues a respective booking message announcing the resulting changes in the future energy consuming devices to the other energy consuming devices of this group or to the central energy management control device. Preferably, this booking message includes a detailed power consumption profile with details specifying the desired future energy behavior of the energy consuming device. Thereby, the energy consuming device quantifies the energy it intends to consume or to save.

Preferably, indication messages according to the energy reduction indication message type include a priority indicator specifying how much the respective power consuming devices are hindered by the indicated reduction of energy consumption. Further, the booking messages according to the energy booking message type preferably include a priority indicator specifying how much the respective energy consuming device needs the indicated energy consumption. These priorities are used within the scheduling process to perfectly shape the energy consuming behavior of the energy consuming devices on the consumer needs.

According to a preferred embodiment of the invention, the energy management control protocol has an additional message type, namely an energy indication message type for announcing the current energy consumption of an energy consuming device to the other energy consuming devices of the group or to the central energy management control device. This additional message type improves the scheduling process executed by the energy consuming devices of the group or by the central energy management control device.

BRIEF DESCRIPTION OF THE DRAWINGS

These as well as other features and advantages of the invention will be better appreciated by reading the following detailed description of presently preferred exemplary embodiments taken in conjunction with accompanying drawings of which:

FIG. 2 shows a list of protocol elements of an energy management control protocol used by the energy consuming devices of FIG. 1.

DETAILED DESCRIPTION OF THE INVENTION

Figure 1:
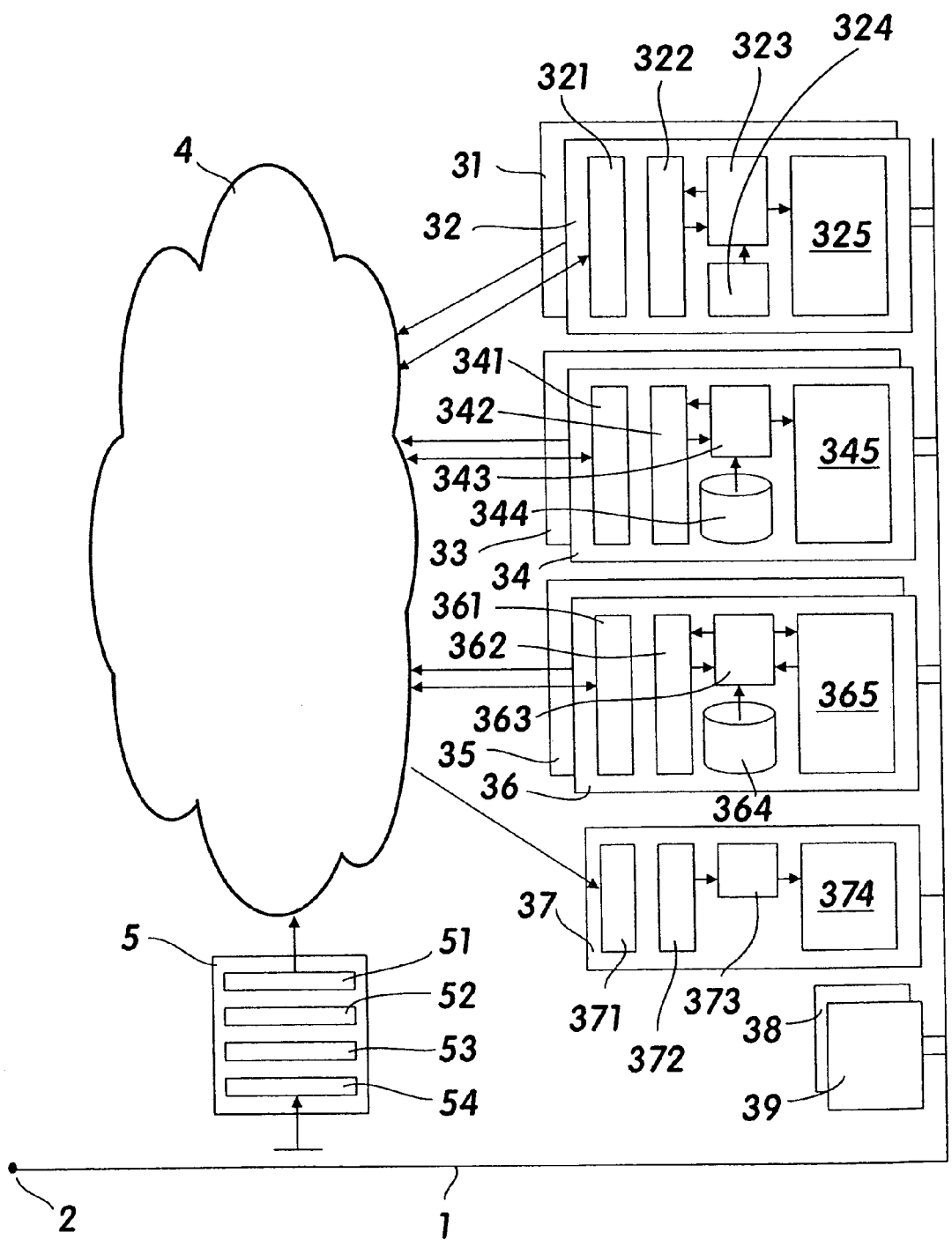
FIG. 1 is a block diagram showing an energy management system with a plurality of energy consuming devices according to the invention.

FIG. 1 shows an energy management system with a group of energy consuming devices 31 to 39 and an energy management measurement unit 5. The energy consuming devices 31 to 39 are connected with a power grid 1 connected via a connector 2 with the power distribution network of an electrical power provider. The power grid 1 forms the power distribution network of a customer of this electrical power provider. Power consuming devices 31 to 39 represent the power consuming devices of this customer in an exemplary manner. The customer might be any type of customer or a combination of different types of customers, including residential, commercial and industrial customers. The number and kind of power consuming devices 31 to 39 depend on the type of customer. By way of example, the invention is in the following described by means of a management system for a residential customer.

The group of energy consuming devices is composed of a plurality of different kinds of energy consuming devices, wherein FIG. 1 exemplifies different kinds of energy consuming devices 31 and 32, 33 and 34, 35 and 36, 37, 38 and 39.

The energy consuming devices 31 to 39 are, for example, performed by various domestic appliances of the customer, for example washing machine, tumble-dryer, refrigerator, freezer, heater, boilers, consumer electronics and lighting.

The energy consuming devices 31 and 32 are in the following exemplified by means of the energy consuming device 32.

The energy consuming device 32 comprises, besides the typical electrical and mechanical components of the respective type of energy consuming device, an electronic circuit. This electronic circuit comprises a microprocessor with various peripheral components, a software program executed by this microprocessor and a communication circuit enabling the communication of the energy consuming device 32 with other energy consuming devices of the group and with the energy management measuring device 5 via a communication media 4. From a functional point of view, the energy consuming device 32 comprises a communication unit 321, a protocol handling unit 322, a control unit 323, a measurement unit 324 and an energy consuming part 225.

The energy consuming part 325 represents the energy consuming task of the energy consuming device 32, for example the functionalities of a washing machine, a refrigerator, a dish-washer, a heater or a boiler.

The measurement unit 324 measures the energy consumed by the energy consuming device 32 and submits these data to the control unit 323. For example, the measurement unit 324 currently measures the electrical current consumed by the energy consuming part 325. The sensed measurement values are digitized and transmitted as a digital value to the control unit 323 which determines by these values the energy at the moment consumed by the energy consuming device 32.

The communication unit 321 contains all functionalities for enabling an exchange of data between the energy consuming devices 31 to 37 and between these energy consuming devices and the energy management measuring device 5 via the communication media 4. Preferably, this communication uses a power line, bluetooth, wireless LAN or LAN based communication service (LAN=Local Area Network). For example, the communication unit 321 comprises the hardware components for implementing a power line transceiver which exchanges data with corresponding power line transceivers of the energy consuming devices 31 to 37 and the energy management measuring device 5 via the power grid 1, which forms according to this embodiment the communication media 4. Further, the communication unit 321 comprises corresponding software drivers and software programs executing a communication protocol that supports the exchange of data via the transmission channel provided by these transceivers.

Alternatively, the communication unit 321 contains a radio transceiver, software drivers and software programs for exchanging data via a wireless bluetooth or WLAN interface. In such case, the communication media 4 is composed by the respective air interface. But, it is also possible that the communication unit 321 uses a different kind of communication service for exchanging data with the other energy consuming devices and the energy measuring device 5, for example via a telephone network or an IP based network (IP=Internet Protocol).

The protocol handling unit 322 comprises functionalities for handling an energy management control protocol used by the energy consuming devices 31 to 37 and by the energy management measuring device 5 to negotiate the energy consumption behavior of the energy consuming devices 31 to 37. The protocol handling unit 322 is, for example, constituted by a software program providing such functionalities when executed on the microprocessor of the energy consuming device 32. The energy management control protocol handled by the protocol handling unit 322 contains at least following message types:

It comprises an energy booking message type, messages of this message type announcing the future desired energy consumption of an energy consuming device. Preferably, such messages comprise details about the future energy consumption profile, for example the detailed power consumption of the power consuming device dependent on time. Beside absolute values, messages of this message type may also announce a specific increase or decrease of power consumption.

The energy management control protocol comprises an energy reduction indication message type. Messages of this message type announce possible reduction of energy consumption of the energy consuming device. Although in this case, the messages may specify the possible reduction of energy consumption in a detailed way, for example giving several detailed alternatives of energy reduction possibilities together with associated priorities.

The energy management control protocol further comprises a granting message type. Messages of this message type are used for granting an energy booking message and/or an energy reduction indication message.

In addition to these message types, the energy management control protocol may in addition comprise a request message type for requesting the submission of booking and/or indication messages or requesting a specific energy consumption. Further, the energy management control protocol may contain further types of indication messages, for example used to announce the current power consumption of an energy consuming device.

An embodiment of an energy management control protocol that may be used by the protocol handling unit 322 is in the following exemplified by means of FIG. 2.

FIG. 2 shows an example of the construction of a protocol message according to an aforementioned energy management control protocol. The lines represent different protocol elements of the energy management control protocol that may be used to establish a protocol message.

The first column specifies the protocol element the message refers to:

0 represents a new message or a new function.
1 represents a new object.
2 represents the description of a first stage object.
3 represents the description of a second stage object.
4 represents a description of a third stage object.

The second column lists different protocol element indicators.

HEAD represents the header of the protocol.
SOURCE represents the program or the supplier.
VERSION represents the version of the program.
ADDRESS represents the address of the destination the message is directed to.
TYPE represents the message type of the message. Messages of a "BOOK" message type announce a desired future power consumption profile. Messages of a "GRANT" message type grants such announced power consumption profile. Messages of an "INDICATION" message type announce the current power consumption. Messages of a "REQUEST" message type inquire about future reduction of power consumption. Messages of the "INDICATION" message type reply to such messages and indicate a possible reduction of power consumption. Messages of the "GRANT" message type grant the indicated possible power consumption for the future. Messages of the "REQUEST" message types request the immediate reduction of power consumption.

UNITS represents the number of units.

DIMENSION represents the dimension, for example W, mW, kW.

DATE represents the date.

PRIORITY represents the priority, for example one of six priorities.

TIME represents the time, for example the hour, the minute and the second.

GRADIENT represents the increase of power.

PHASE represents the phase shift.

ANGLE represents the angle.

START represents the start or the activation of a function.

END represent the end of a function or the switch off.

TRANSACTION_ID represents a transaction number.

TRAILER represents the closure of the message.

The last column of FIG. 2 represents the actual value chosen for the respective protocol element with regard to following example:

An energy consuming device announces a desired energy consumption, wherein it intends to switch on power consumption at Jan. 1, 2005, 0:00 A.M. with 1500 Watt, to decrease the power consumption in the following in a linear way until 0:06 A.M. to 500 Watt, and switch off the power consumption at 0:10 A.M.

The control unit 323 of FIG. 1 controls the device-side part of the energy management method executed by the system shown in FIG. 1. Typically, the control unit 323 is constituted by a software program executed by the microprocessor of the energy consuming device 32, which interacts with one or several software programs assigned to the energy consuming part 325 to control the energy consumption of the energy consuming device 32. The control unit 323 negotiates the energy consumption of the energy consuming device 32 by means of the energy management control protocol handled by the protocol handling unit 322 and controls the energy consumption of the energy consuming device 325 according to the results of this negotiation.

The energy consuming devices 33 and 34 are in the following described by means of the energy consuming device 34. The energy consuming device 34 comprises a communication unit 341, a protocol handling unit 342, a control unit 343, a storage unit 344 and an energy consuming part 345. The storage unit 344 stores a set of digital data specifying an energy consumption profile of the energy consuming device 34. The energy consuming profile describes the energy consuming behavior of the energy consuming device 34, for example its energy consumption dependent on operational conditions, status and time. It is possible for the control unit 343 to determine by means of this data the energy at the moment consumed by the energy consuming devices and to calculate a prediction of the future energy consumption of the energy consuming device 34.

Further, the components of the energy consuming device 34 provide the functionalities of the corresponding communication unit 321, protocol handling unit 322, control unit 323 and energy consuming part 325 of the energy consuming device 32.

The energy consuming devices 35 and 36 are in the following described by means of the energy consuming device 36.

The energy consuming device 36 comprises a communication unit 361, a protocol handling unit 362, a control unit 363, a storage unit 364 and an energy consuming part 365. These components provide the functionalities of the corresponding components of the energy consuming device 34 with the difference that the control unit 363 receives from the energy consuming part 364 operational data describing the actual operation status of the energy consuming part 365 and further information specifying whether the energy consumption of the energy consuming part 365 can be interrupted or decreased dependent on the current conditions.

The energy consuming device 37 has a communication unit 371, a protocol handling unit 372, a control unit 373, and an energy consuming part 374. These components provide the functionalities of the corresponding components of the energy consuming device 32, with the difference that the control unit 372 solely influences energy consumption of the energy consuming part 374 dependent on protocol messages received by one of the energy consuming devices 31 to 36.

The energy consuming devices 38 and 39 have no communication means and, for example represent some energy consuming devices which are not equipped according to the invention.

The energy management measurement unit 5 comprises a communication unit 51, a protocol handling unit 52, a control unit 53 and a measurement unit 54.

The measurement unit 54 measures the total electrical power consumed by the energy consuming devices 31 to 39 of the group. It digitizes this value and reports it to the control unit 53.

The communication unit 51 and the protocol handling unit 52 provide the functionalities of the communication unit 321 and the protocol handling unit 322 of the power consuming device 32, respectively.

The control unit 53 communicates via the energy management control protocol with the energy consuming devices 31 to 37. It receives information about the total consumed energy from the measurement unit 54. Further, it may store an energy consumption group profile specifying the available energy assigned to the group of energy consuming devices 31 to 39, namely the available energy assigned to the consumer according to his contract with the electrical energy provider. This profile, for example, specifies a time dependent peak load and basic load arranged between the electrical energy provider and the consumer, possible deviations from the arranged basic load, specific contractor conditions for classes of deviations from a basic profile and the maximum increase of power consumption per time unit. The group profile may be stored in a data base of the energy management measuring device 5 or may be downloaded from a server of the electrical energy provider. The group profile may be simple or complex, dependent on the contractual arrangement between the electrical energy provider and the consumer and of the type of the consumer. Dependent on the received information about the available power consumption of the group and the actual power consumption of the group, the control unit 53 issues respective request messages according to the power management control protocol to the energy consuming devices 31 to 37 to increase or decrease power consumption.

When receiving a request to decrease power consumption, the energy consuming devices 31 to 36 determine possible reduction of energy consumption, assign priorities to these possibilities and announce these possibilities via an indication message to the other ones of the energy consuming devices 31 to 36.

For example, the control units 343 and 363 check by help of the data received from the memory unit 344 and the memory unit 364 as well as the power consuming part 365 whether the energy consuming device is in an operational state that allows interruption or decrease of energy consumption.

For example, a washing machine can stop at stage of the washing program and may delay the start of the spin-dry-program. But, the interruption of a hot-wash program leads to energy losses due to cooling and it has therefore drawbacks to interrupt the energy consumption of the washing machine in this operational state. The priorities set in the booking or indication messages by the control units 343 and 363 reflect these dependencies.

For example, the operation of a compressor or a refrigerator or freezer might be interrupted for a specific time, if the cooling temperature of the refrigerator or freezer does not exceed a predefined critical temperature. If the cooling temperature exceeds such temperature, the control units 343 and 363 assign a corresponding high priority to the booking and indication messages.

For example, a tumble-dryer may be interrupted within predefined time frames without any operational drawback.

Based on a common set of scheduling rules implemented in each of the control units 322, 342 and 362, a new scheduling of the available energy consumption is processed by each of the energy consuming devices 31 to 36 by means of the received information. Since each of the energy consuming devices 31 to 36 have the same set of scheduling rules, they all come to the same result. Further, it is also possible that only one or two of the energy consuming devices perform the scheduling process and announce the scheduling results via granting messages to the other energy consuming devices involved in the process. Further, it is also possible that each of the energy consuming devices confirms the result of its scheduling process by sending a respective granting message to the energy consuming devices which have to reduce the power consumption.

Further, it is possible that different device priorities are assigned in the scheduling rules to different energy consuming devices. Such device priorities reflect the priorities chosen by the customer for its different energy consuming devices.

When receiving a request to increase power consumption, the power consuming devices 31 to 36 determine by means of the available data their possibilities to increase the power consumption and generate respective booking messages, specifying this increase of power consumption as well as an associated priority. As described above, the power consuming devices 31 to 36 negotiate the requested increase of power consumption by help of the exchange of these messages and perform a scheduling process resulting in a respective increase of power consumption. Further, the control units 323, 343 and 363 scan for changes in the power consumption behavior of the respective power consuming parts 325, 345 and 365, e.g. caused by an external event. If they detect such a change, they issue a corresponding booking message to the other ones of the energy consuming devices 31 to 36. Dependent on the content of this booking message, i.e. whether the booking message requests an increase or decrease of the power consumption of the respective power consuming device, the other energy consuming devices issue indication messages or booking messages as described above. The power consuming devices 31 to 36 negotiate their power consumption behavior by means of the exchange of these messages and come to a new scheduling of the power consumption as described above.

Further, it is also possible that the scheduling of power consumption is controlled by a central energy management control device receiving the indication and booking messages of the energy consuming devices 31 to 36 and assigning energy consumption to these energy consuming devices by means of granting messages issued to these power consuming devices. Preferably, such energy management control device comprises the functionalities of the energy management measuring unit 5.

The invention claimed is:

1. A method of managing energy consumed by a group of energy consuming devices, the method comprising the steps of:
   exchanging messages according to an energy management control protocol via a communication media between energy consuming devices of the group of energy consuming devices and/or between energy consuming devices of the group of energy consuming devices and an energy management control device and/or an energy management measuring device, the energy management control protocol comprising indication messages of an energy reduction indication message type for announcing possible reductions of energy consumption, said indication messages including a priority indicator specifying how much the respective power consuming device is hindered by the indicated reduction of energy consumption;
   negotiating the energy consumption of an energy consuming device of the group of energy consuming devices by means of the messages exchanged according to the energy management control protocol; and
   controlling the energy consumption of the energy consuming device according to the result of this negotiation.

2. The method of claim 1, wherein said energy managing control protocol further comprises an energy booking message type for announcing future energy consumptions and a granting message type for granting an energy booking message and/or an indication message.

3. The method of claim 1, wherein the method comprises the further steps of: issuing a request message according to a request message type of the energy management control protocol to one or more energy consuming devices, the request message requesting the reduction or the increase of energy consumption; and replying, at the one or more energy consuming devices, an indication message according to the energy reduction indication message type or a booking message according to an energy booking message type for announcing future energy consumptions of the energy consuming device.

4. The method of claim 3, wherein the request message includes information about the requested reduction or increase of energy consumption, in particular specifying an energy consumption profile.

5. The method of claim 1, wherein the method comprises the further step of issuing, at an energy consuming device of the group of energy consuming devices, a booking message according to an energy booking message type for announcing changes in the future energy consumption behavior of the energy consuming device, when detecting a corresponding event, in particular a corresponding control command of the consumer.

6. The method of claim 1, wherein said protocol includes booking messages according to an energy booking message type which include a priority indicator specifying how much the respective energy consuming device needs the indicated energy consumption.

7. The method of claim 2, wherein the energy management control device schedules energy consumption with respect to available energy assigned to the group of energy consuming devices and with respect to booking messages and indication messages received from energy consuming devices of the group of energy consuming devices, and wherein the energy management control device issues granting messages to the energy consuming devices according to the scheduling result.

8. The method of claim 1, wherein the energy consuming devices of the group of energy consuming devices constitute a self-organizing network of power consuming devices interacting via the energy management consumption control protocol, and wherein any of the energy consuming devices has a set of scheduling rules and negotiates its energy consumption according to these rules.

9. An energy consuming device of a group of energy consuming devices, the energy consuming device having
   a communication unit for communicating with other energy consuming devices of the group of energy consuming devices and/or with an energy management control device and/or with an energy management measuring device,
   a protocol handling unit for handling an energy management control protocol, the energy management control protocol comprising an energy reduction indication message type for announcing possible reductions of energy consumption, said messages of energy reduction indication message type including a priority indicator specifying how much the respective power consuming device is hindered by the indicated reduction of energy consumption, said protocol further including an energy booking message type for announcing future energy consumptions, and a granting message type for granting an energy booking message and/or an energy reduction indication message, and
   a control unit for negotiating the energy consumption of the energy consuming device by means of the protocol handling unit and controlling the energy consumption of the energy consuming device according to the results of this negotiation.

10. A method of managing energy consumed by a group of energy consuming devices, the method comprising the steps of:
   exchanging messages according to an energy management control protocol via a communication media between energy consuming devices of the group of energy consuming devices and/or between energy consuming devices of the group of energy consuming devices and an energy management control device and/or an energy management measuring device, the energy management control protocol including indication messages of an energy reduction indication message type for announcing possible reductions of energy consumption, and booking messages according to an energy booking message type for announcing future energy consumptions of said energy consuming device and which include a priority indicator specifying how much the respective energy consuming device needs the indicated energy consumption;
   negotiating the energy consumption of an energy consuming device of the group of energy consuming devices by means of the messages exchanged according to the energy management control protocol; and
   controlling the energy consumption of the energy consuming device according to the result of this negotiation.

11. The method of claim 10, wherein said energy management control protocol further comprises a granting message type for granting an energy booking message and/or an indication message.

12. The method of claim 10, wherein the method comprises the further steps of: issuing a request message according to a request message type of the energy management control protocol to one or more energy consuming devices, the request message requesting the reduction or the increase of energy consumption; and replying, at the one or more energy consuming devices, an indication message according to the energy reduction indication message type or a booking message according to the energy booking message type.

13. The method of claim 12, wherein the request message includes information about the requested reduction or increase of energy consumption, in particular specifying an energy consumption profile.

14. The method of claim 10, wherein the method comprises the further step of issuing a booking message at an energy consuming device of the group of energy consuming devices when detecting a corresponding event, in particular a corresponding control command of the consumer.

15. The method of claim 10, wherein said indication messages include a priority indicator specifying how much the respective power consuming device is hindered by the indicated reduction of energy consumption.

16. The method of claim 10, wherein the energy management control device schedules energy consumption with respect to available energy assigned to the group of energy consuming devices and with respect to booking messages and indication messages received from energy consuming devices of the group of energy consuming devices, and wherein the energy management control device issues granting messages to the energy consuming devices according to the scheduling result.

17. The method of claim 1, wherein the energy consuming devices of the group of energy consuming devices constitute a self-organizing network of power consuming devices interacting via the energy management consumption control protocol, and wherein any of the energy consuming devices has a set of scheduling rules and negotiates its energy consumption according to these rules.

18. An energy consuming device of a group of energy consuming devices, the energy consuming device having
   a communication unit for communicating with other energy consuming devices of the group of energy consuming devices and/or with an energy management control device and/or with an energy management measuring device,
   a protocol handling unit for handling an energy management control protocol, the energy management control protocol comprising an energy reduction indication message type for announcing possible reductions of energy consumption, said messages of energy reduction indication message type including a priority indicator specifying how much the respective power consuming device is hindered by the indicated reduction of energy consumption, said protocol further including an energy booking message type for announcing future energy consumptions, and a granting message type for granting an energy booking message and/or an energy reduction indication message, and
   a control unit for negotiating the energy consumption of the energy consuming device by means of the protocol handling unit and controlling the energy consumption of the energy consuming device according to the results of this negotiation.

* * * * *